Oct. 11, 1960    J. G. JONES    2,955,720
APPARATUS FOR ESTABLISHING ARCHING OF FIBROUS MATERIAL
Filed Sept. 11, 1958    2 Sheets-Sheet 1

INVENTOR.
JOHN G. JONES
BY
Attorneys

Oct. 11, 1960 J. G. JONES 2,955,720
APPARATUS FOR ESTABLISHING ARCHING OF FIBROUS MATERIAL
Filed Sept. 11, 1958 2 Sheets-Sheet 2

INVENTOR.
JOHN G. JONES
BY
Attorneys

United States Patent Office 2,955,720
Patented Oct. 11, 1960

2,955,720
APPARATUS FOR ESTABLISHING ARCHING OF FIBROUS MATERIAL

John G. Jones, Kankakee, Ill., assignor to A. O. Smith Corporation, Milwaukee, Wis., a corporation of New York Filed Sept. 11, 1958, Ser. No. 760,413

5 Claims. (Cl. 214—17)

This invention relates to an apparatus for establishing arching of fibrous material above a trough in the floor of a storage structure in order to facilitate the entry of a mechanical unloading unit within the trough.

In order to prevent undue spoilage of forage materials or other fibrous vegetable materials, the material is often stored in a sealed, air tight structure or silo. In order to remove the material from the sealed silo, a bottom unloader is employed which is located at the floor level of the silo. A typical bottom unloading mechanism, as disclosed in the Patent No. 2,635,770 of Julius Tiedemann, employs a cutter arm which is rotatably supported at the center of the silo and rotates within the bottom of the silo. The arm carries a cutter chain which travels in an endless path as the arm rotates to cut the silage or other stored material and move the cut material to the center of the silo where it is discharged into a radially extending trough formed in the floor of the silo. A conveyor located within the trough conveys the cut silage to the exterior of the silo.

With a bottom unloading device such as this, the unloader is removed from the silo when the same is being filled with silage, because the weight of the silage bearing on the unloader would produce an undue torque load on the unloader and prevent the cutter arm from rotating. Thus, the silo is filled with the unloading mechanism removed from the silo and after filling, the unloader is inserted into the trough in the floor of the silo with the cutter arm disengaged, so that the arm will not rotate, but with the cutter chain operating. The unloader is then moved progressively through the trough toward the center of the silo and the chain cuts or digs its way into the silage until the unloader is in its proper position. The silage being of a fibrous nature will form an arch over the unloader as the same cuts its way in so that the entire weight of the silage will not bear on the unloader. In this method of digging the unloader into the filled silo, a difficulty arises in that the silage mass located above the central opening to the trough is not completely removed and, on rotating the cutter arm, the delivery of the cut silage into the central opening is restricted.

The present invention is directed to an apparatus to be positioned above the trough while the silo or storage structure is filled with the stored material to establish an arch above the trough. After filling the storage structure, the apparatus is removed and the unloader is inserted into the silo within the arch. The use of the present invention facilitates the entry of the unloader, for the unloader is required to cut only a minimum of material in order to dig its way into its proper position in the silo.

More specifically, the apparatus consists of a hood or cover which extends upwardly over the trough and is generally coextensive with the length of the trough. The hood is supported by a plurality of spaced legs which are hingedly connected to the hood. After the silo is filled with the stored material, the hood is pulled radially outward causing the legs to pivot with respect to the hood to drop the hood within the trough where the same can be readily removed to the exterior of the silo. The fibrous material, which arched over the top of the hood, will retain this arched condition after removal of the hood due to the fibrous nature of the stored material.

The unloading mechanism is then inserted into the trough, and the arch above the trough receives the cutter arm so that a minimum of silage or stored material need be cut out in order to insert the unloading mechanism.

The present invention provides a very simple apparatus for establishing arching over the trough in the floor of the silo to facilitate entry of the loading mechanism into the silo. This apparatus substantially increases the speed of installation of the unloader, for the unloader is not required to cut a path through the stored material to the center of the silo. Furthermore, the hood maintains the area immediately above the central opening to the trough free of silage so that full delivery of silage to the trough can be obtained when the cutter arm is rotated.

Other objects and advantages of the invention will appear in the course of the following description.

The drawings illustrate the best mode presently contemplated of carrying out the invention.

Figure 1:
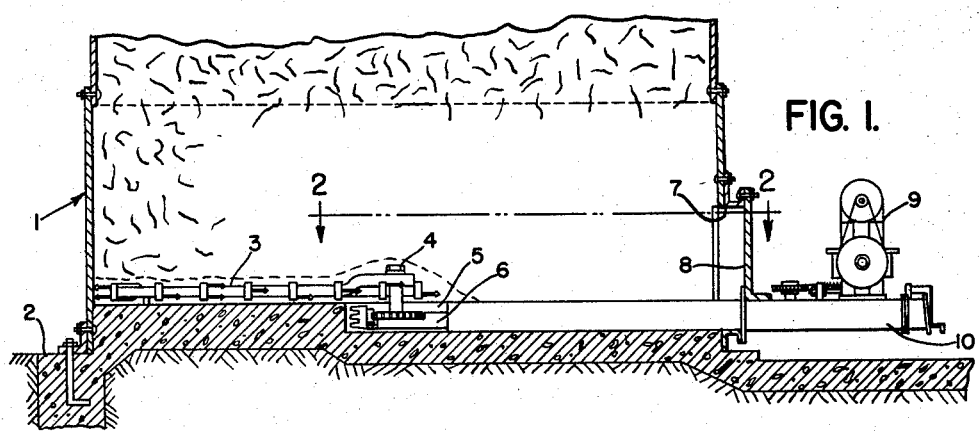
Figure 1 is a fragmentary side elevation of a storage structure with the unloading unit disposed within the bottom of the structure.

The drawings illustrate a generally air-tight storage structure 1 which rests on a floor or foundation 2 and is adapted to contain a stored material, such as silage, haylage, wood chips, or other fibrous material.

The stored material is removed from the storage structure by an unloading unit which includes a cutter arm 3 which is rotatably mounted about a post 4 located at the center of the storage structure. The cutter arm carries a cutting element, such as a chain, which travels in an endless path about the cutter arm as the arm rotates about post 4 to undercut the silage and convey the cut silage to the center of the silo. The cut silage is deposited in a radially extending trough 5 formed in floor 2, and a conveyor unit 6 is located within the trough 5 and serves to convey the cut material from the center of the silo to the exterior.

The conveyor unit 6 extends through a suitable opening 7 in the wall of the storage structure and the upper portion of the opening 7 above the conveyor unit is sealed against the ingress of air by a door 8.

The cutter arm 3 and conveyor 6 are driven by a suitable power unit 9 which is supported on the outer end 10 of the conveyor unit 6.

Figure 2:
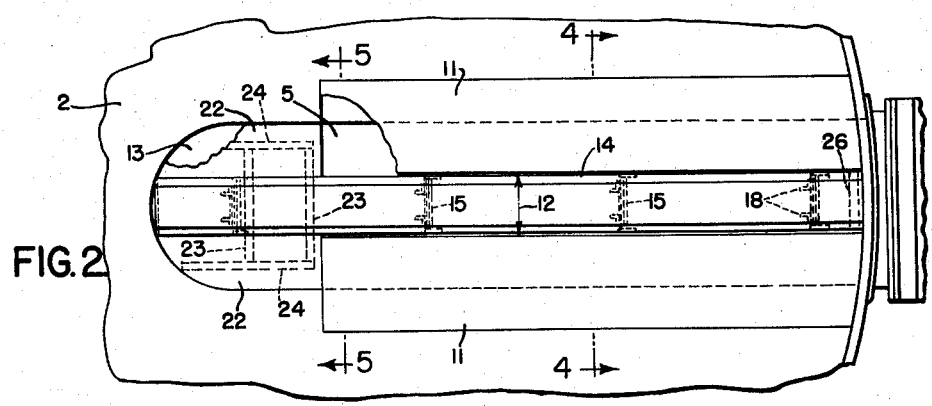
Fig. 2 is a fragmentary sectional view taken along line 2—2 of Figure 1 with the unloading unit removed from the structure and the apparatus of the invention disposed within the trough.

As best shown in Fig. 2, a pair of floor plates 11 are secured to the floor 2 and project over the trough 5. The upper surface of the floor plates 11 is substantially flush with the upper surface of the floor so that the cutter arm may rotate freely across the floor without obstruction. The edges of the plates 11 are spaced to provide a clearance 12 which extends radially of the storage structure. When the unloading unit is in position within the storage structure, a suitable plate, associated with the conveyor unit 6, extends within the clearance 12 to prevent silage from falling therein.

The inner ends of the plates 11 are spaced from the center of the storage structure 1 to provide a central opening 13 through which the cut silage is discharged by the cutter arm 3 into the trough 5.

Figure 4:
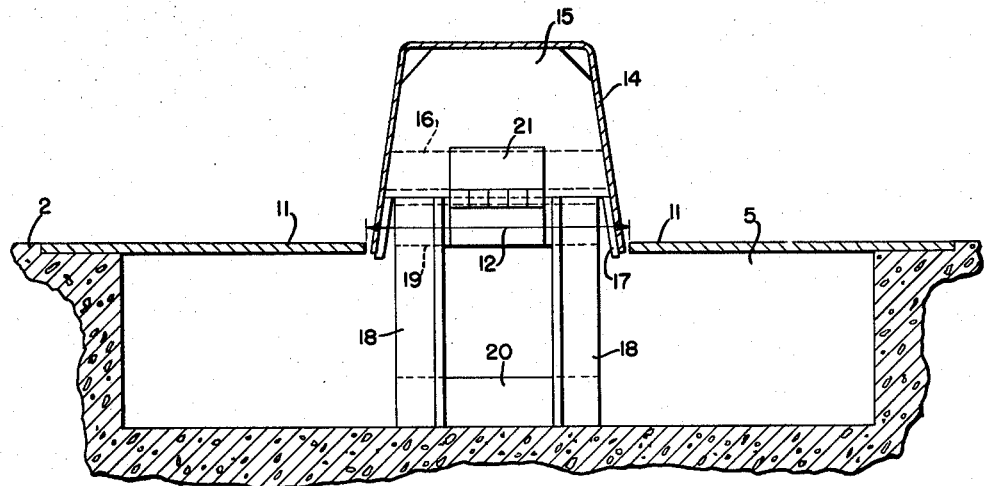
Fig. 4 is a view taken along line 4—4 of Fig. 2.
Figure 5:
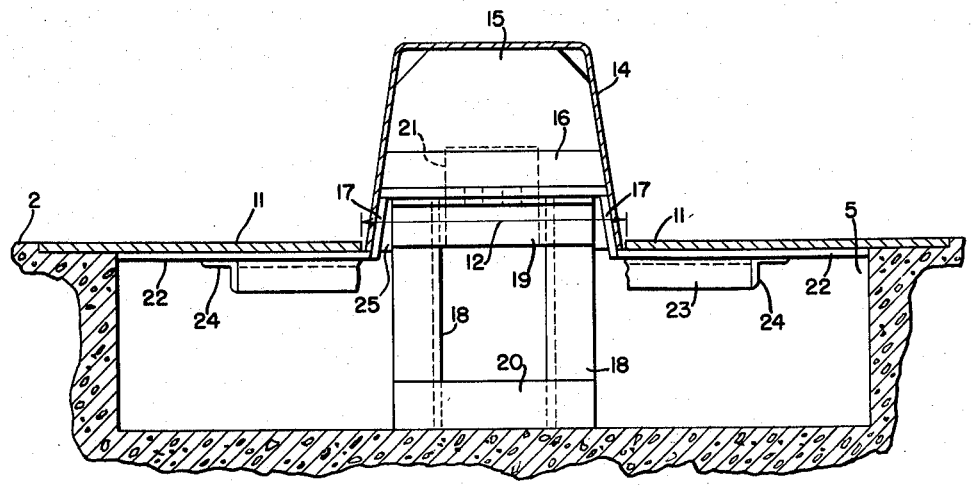
Fig. 5 is a sectional view taken along line 5—5 of Fig. 2.

The unloading unit, including the cutter arm 3 and the conveyor unit 6, is not positioned within the storage structure until after the structure is filled with the stored material. In order to facilitate the entry of the unloader within the filled storage structure, a hood 14 is disposed within the clearance 12 between the floor plates 11 and extends generally coextensively above the trough from the periphery of the storage structure to the center thereof. As best shown in Figs. 4 and 5, the hood 14 is provided with upwardly sloping side walls and a generally flat top. The sloping side walls permit the hood to be lowered within the clearance 12 without obstruction by the edges of the floor plates 11. The height of the hood is approximately the same as the height of the center post 4 of the unloader, so that the post can be moved inwardly through the arch formed by the hood to the center of the silo.

The hood 14 is reinforced by a series of longitudinally spaced vertical plates 15 and by a series of angle bars 16 which are secured to the plates 15 and extend between the side walls of the hood. Further reinforcement is provided by a pair of longitudinally extending shoe plates 17 which are secured to the side walls of the hood beneath the angle bars 16.

To support the hood 14 within the clearance 12, a plurality of pairs of legs 18 are pivotally connected to the hood in spaced relation along the length of the hood. The legs are adapted to rest on the bottom of the trough and support the hood 14 above the floor level. Each pair of legs 18 is connected together by an upper angle bar 19 and a lower brace 20.

Figure 3:
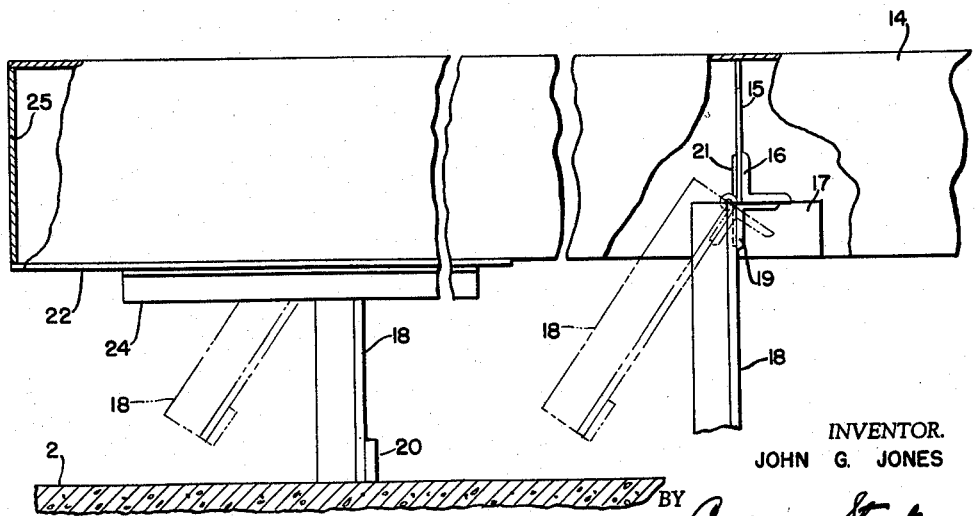
Fig. 3 is a fragmentary, vertical section taken through the trough in the floor of the storage structure with the apparatus of the invention disposed within the trough.

To permit the hood 14 to be lowered within the trough 5 after the storage structure is filled with the storage material, a hinge 21 is connected between the vertical plate 15 and the corresponding angle bar 19. The hinge 21 permits the legs 18 to be pivoted, as shown in the dashed lines in Fig. 3, when an outward force is applied to the outer end of the hood 14.

While the hinge connection is shown between the upper end of the legs 18 and the hood 14, it is contemplated that the hinging arrangement could be at a position intermediate the ends of the legs or any other pivotal mechanism could be employed which would decrease the distance between the plane extending through the upper extremity of the hood and the plane extending through the lower extremity of the legs when the hood is subjected to an outward pull or force.

During filling of the silo, the stored material is prevented from falling within the central opening 13 by a pair of extension plates 22 which extend laterally outward from the hood 14. The plates 22 are shaped to complement the opening 13 and are disposed beneath the level of the floor plates 11 so that the extension plate can be inserted and removed from the trough beneath the level of the floor plates 11.

The extension plates 22 are supported by a pair of transversely extending stiffeners 23 and a pair of longitudinal stiffeners 24 which are secured to the ends of the transverse stiffeners 23.

In operation, the arching device of the invention is initially inserted into the trough 5 through the opening 7 in the silo wall. The hood 14 extends upwardly from the clearance 12 between the floor plates 11 and the extension plates 22 cover the central opening 13 in the trough. With the arching apparatus in position, the silo is then filled with the stored material and a radially extending arch is formed in the material due to the hood 14. The inner end of the hood 14 may be enclosed by a plate or cover 25 to prevent the stored material from being blown into the hood during filling of the silo.

After the silo has been filled, a force is applied to the outer end of the hood 14 causing the legs 18 to pivot with respect to the hood and to collapse or lower the hood within the trough where the same can be removed. In addition to collapsing the hood by applying an outward force to the outer end of the hood, it is possible to use a rod or other means to knock the legs 18 backward and collapse the hood. As the stored material is of a fibrous nature, the arch, which is formed by the hood 14, will be retained within the silage mass. A transverse stiffener 26 extends between the side walls of the hood at the outer end portion of the hood and serves as a connection to which the outward force may be applied.

After removal of the hood 14, the unloader is inserted into the trough with the cutter arm 3 and post 4 extending into the arched area. Due to the formation of the arch, the unloader can be readily inserted within the trough until the center post is located at the approximate center of the silo.

As the hood 14 extends to the inner end of the trough 5 and as the extension plates 22 cover the remainder of the central portion 13 of the trough, an arch will be formed over the central portion 13 and this will facilitate the discharge of the cut silage into the trough when the cutter arm is rotated.

The present invention provides a simple and inexpensive means for providing an arch above the trough in the floor of the silo to facilitate the entry of the unloading device. The pivotal connection between the legs and the hood permits the hood to be lowered within the trough after the silo is filled and to be readily removed from the silo.

In the conventional method of installing the unloader, without the use of the hood of the present invention, the cutter arm is initially inserted into the silo with a shortened length. The shortened cutter arm is then rotated within the silo and the shortened arm aids in establishing a bridge or dome of the stored material at the bottom of the silo. After the bridge has been established, the unloader is removed and the cutter arm restored to its normal length. The unloader is then reinstalled in the silo and the unloading continued. However, with the use of the collapsible hood 14 of the present invention, the need for the shortened cutter arm operation will be eliminated in most cases due to the arch established by the hood which will remove a substantial portion of the weight of the stored material from the cutter arm.

Various modes of carrying out the invention are contemplated as being within the scope of the following claims particularly pointing out and distinctly claiming the subject matter which is regarded as the invention.

I claim:

1. An apparatus for establishing arching of a fibrous storage material above a trough in the floor of a storage structure in order to facilitate entry of a mechanical unloading unit within the structure, comprising a hood extending generally coextensive with the trough and projecting upwardly from said trough above the floor level of said storage structure, said hood having a generally U-shaped cross section with the open end of said hood facing downwardly toward said trough, a series of legs connected to the hood and disposed to rest on the bottom of the trough and support the hood, said hood serving to support the fibrous material introduced into said storage structure and establish an arch in said fibrous material above said trough, means for hingedly connecting said legs to said hood whereby an outward force applied to the outer end of said hood will tend to pivot said legs and said hood into said trough and facilitate removal of the hood from the storage structure, and stop means coupled to said legs to prevent collapse of the legs during filling of the storage structure and to limit the movement of the hood to one direction.

2. An apparatus for establishing arching of a fibrous storage material above a trough in the floor of a storage structure in order to facilitate entry of a mechanical unloading unit within the structure, said trough being partially covered by a pair of floor plates with the adjacent edges of the floor plates being spaced to provide a radially extending clearance therebetween, comprising a hood extending generally the length of said trough and projecting upwardly within the clearance between the floor plates, said hood having a closed top and a pair of upwardly and inwardly sloping side walls with the side walls being disposed in substantial engagement with the respective edges of the floor plates to prevent the storage material from entering said clearance, a series of legs connected to the hood and disposed to rest on the bottom of the trough and support the hood, said hood serving to support the fibrous material introduced into said storage structure and establish an arch in said fibrous material above said trough, means for hingedly connecting said legs to said hood whereby an outward force applied to the outer end of said hood will tend to pivot said legs and said hood in relation to each other to lower the hood into said trough and facilitate removal of the hood from the storage structure, and stop means coupled to said legs to prevent collapse of the legs during filling of the storage structures and to limit the movment of the hood to one direction.

3. An apparatus for establishing arching of a fibrous storage material above a trough in the floor of a storage structure in order to facilitate entry of a mechanical unloading unit within the structure, said trough being partially covered by a pair of floor plates with the adjacent edges of the floor plates being spaced to provide a radially extending clearance therebetween, comprising a hood extending generally the length of said trough and projecting upwardly within the clearance between the floor plates, said hood having a closed top and a pair of upwardly and inwardly sloping side walls with the side walls being disposed in substantial engagement with the respective edges of the floor plates to prevent the storage material from entering said clearance, said hood serving to support the fibrous material introduced into said storage structure and establish an arch in said fibrous material above said trough, supporting members resting on the floor of the trough and connected to support the hood, hinge means secured to the hood and to the supporting members, one-way stop means coupled to the hinge means to prevent collapse of the supporting members while filling the structure and allowing only outward movement of the hood for lowering the hood within the trough after filling said storage structure with the storage material to permit the hood to be readily removed from the storage structure, said arch serving to facilitate the subsequent entry of the mechanical unloader into the trough.

4. An apparatus for establishing arching of a fibrous storage material above a trough in the floor of a storage structure in order to facilitate entry of a mechanical unloading unit within the structure, comprising a hood extending generally coextensive with the trough and projecting upwardly from said trough above the floor level of said storage structure, said hood having a generally U-shaped cross section with the open end of said hood facing downwardly toward said trough, a series of reinforcing members secured to the inner surface of the hood at spaced locations along the length of the hood, said hood serving to support the fibrous material introduced into said storage structure and establish an arch in said fibrous material above said trough, a series of legs pivotally connected to said reinforcing members and disposed to rest on the bottom of the trough and support the hood, and stop means coupled to said legs to prevent collapse of the legs during filling of the storage structure and to limit the movement of the hood to one direction whereby an outward force applied to the outer end of said hood will tend to pivot said legs and said hood in relation to each other to lower the hood into said trough and outwardly of the structure to facilitate removal of the hood from the storage structure.

5. An apparatus for establishing arching of a fibrous storage material above a trough in the floor of a storage structure in order to facilitate entry of a mechanical unloading unit within the structure, said trough being partially covered by a pair of floor plates with the adjacent edges of the floor plates being spaced to provide a radially extending clearance, the inner ends of said floor plates terminating short of the inner end of the trough to provide a central entry to the trough, comprising a hood extending generally the length of said trough and projecting upwardly within the clearance between the floor plates, said hood having a closed top and a pair of upwardly and inwardly sloping side walls with the side walls being disposed in substantial engagement with the respective edges of the floor plates to prevent the storage material from entering said clearance, a pair of extension members secured to the inner end portion of the hood and extending laterally therefrom to substantially cover said central entry and prevent the stored material from falling within the entry, a series of legs connected to the hood and disposed to rest on the bottom of the trough and support the hood, said hood serving to support the fibrous material introduced into said storage structure and establish an arch in said fibrous material above said trough, means for hingedly connecting said legs to said hood, stop means connected to said legs and engaging the hood with the hood within the storage structure to prevent collapse of the legs while filling the structure and to require the hood to move downwardly and outwardly of the storage structure incident an outward force applied to the outer end of said hood to pivot said legs and said hood in relation to each other to lower the hood into said trough and facilitate removal of the hood from the storage structure.

References Cited in the file of this patent

UNITED STATES PATENTS

| | | |
|---|---|---|
| 239,328 | Hunt | Mar. 29, 1881 |
| 1,376,757 | Graham | May 3, 1921 |
| 2,287,944 | Peterman | June 30, 1942 |